Patented Oct. 22, 1929

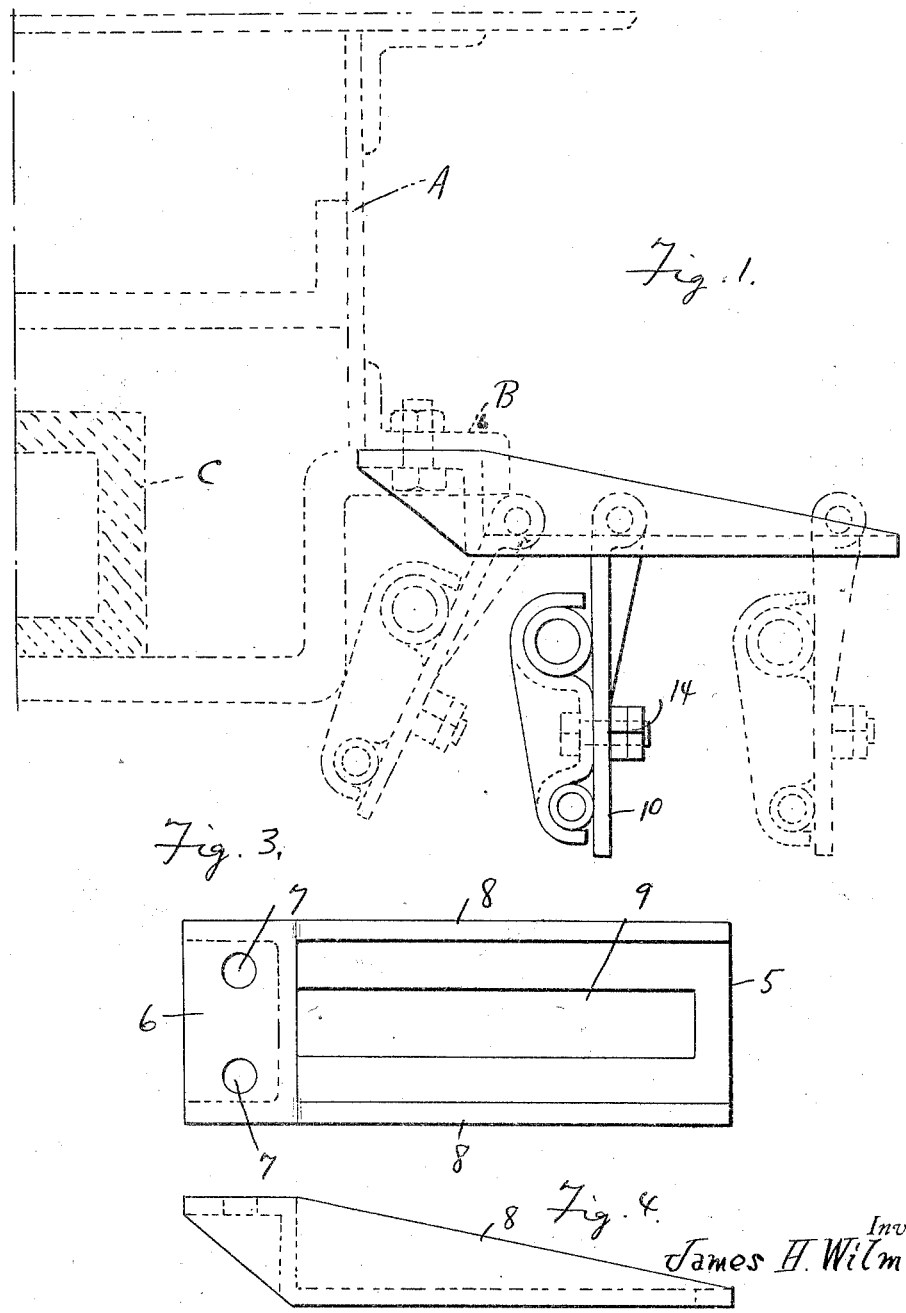

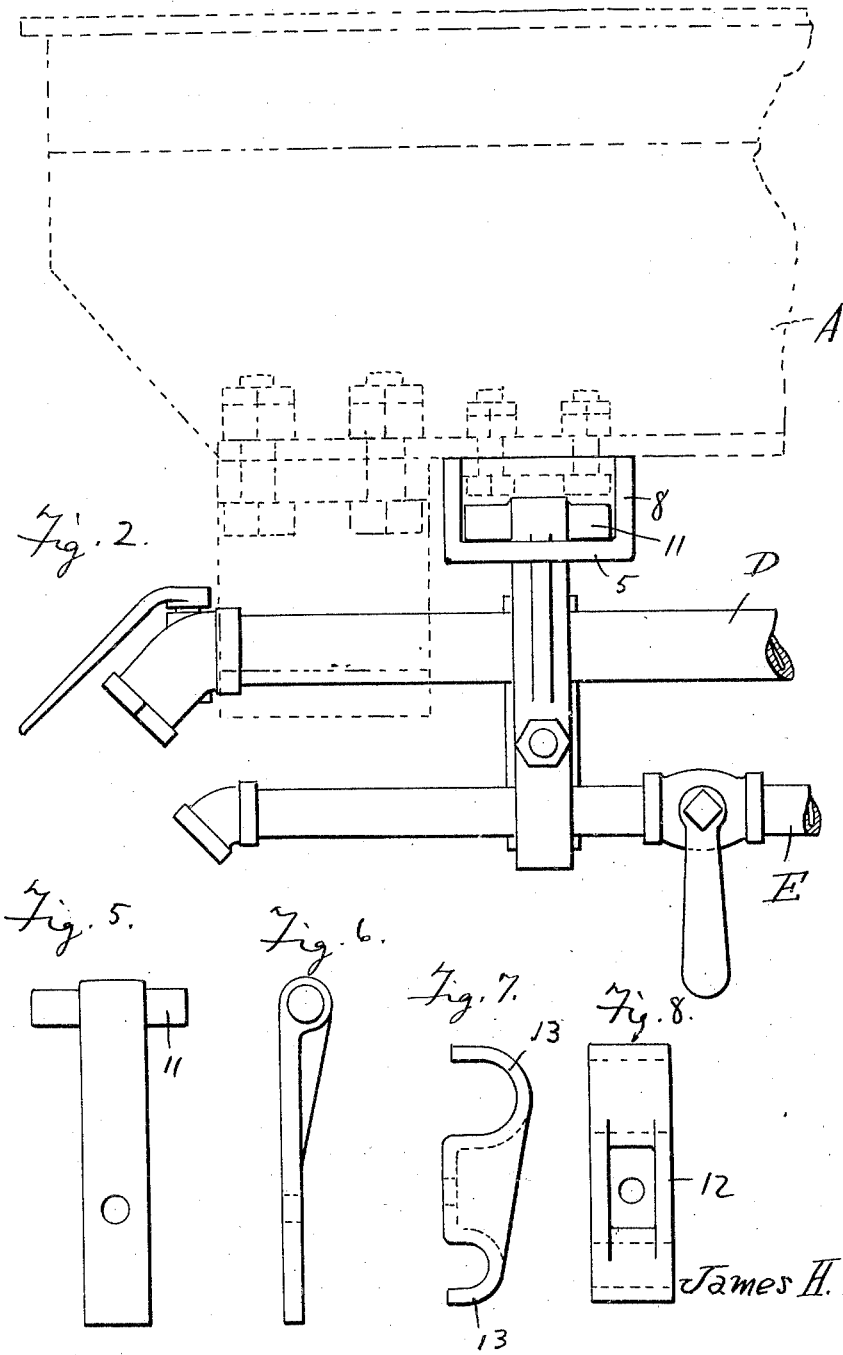

1,732,670

UNITED STATES PATENT OFFICE

JAMES H. WILMORE, OF MARSHALL, TEXAS, ASSIGNOR OF ONE-HALF TO BURKS WILMORE, OF MARSHALL, TEXAS

SLIDING AND SWINGING SUPPORT FOR AIR-BRAKE SIGNAL PIPES OF PASSENGER CARS

Application filed January 19, 1928. Serial No. 247,997.

This invention relates to new and useful improvements in air brake and signal pipe supports for passenger cars and aims to provide such a support that is free to slide and swing with respect to the car. As is well known the stationary clamps now generally in use on passenger cars are the cause of much delay for the reason that while running sharp curves the air brake hose will stretch to such an extent that it will become disconnected between the cars especially when applying the brakes on the entire train.

My movable clamp is so designed as to overcome this difficulty insomuch as the clamp will slide toward the center of the car during the movement of the train around a curve which in reality will compensate for the stretching of the hose had it been rigidly attached to the train.
Further the present clamp is so designed to protect the ends of the train pipes and angle cocks while switching the cars on curved track. In the use of the stationary clamps on passenger cars when making up trains or switching cars on a curved track the cars often miss the coupling and the draw heads striking the angle cocks will break off the ends of the train pipes which causes a great many delays.
The present clamp is so mounted that when the draw heads miss coupling and strike the angle cocks the movable clamp slides out of the way and when the cars are separated the present clamp will readjust itself by the elasticity of the air and signal pipes.

In the drawings wherein like reference characters indicate corresponding parts throughout the several views:

Figure 1 is a fragmentary diagrammatic end elevation of the frame of a passenger car equipped with my improved sliding and swinging support for the air brake and signal pipe, the pipe clamp per se being disclosed in full line normal position, in dotted line position at the inner end of the clamp support bracket the position that will be assumed with cars on a curve, and the right hand dotted line position indicating the position of the clamp per se when the same is hit by the coupler of a connecting car.

Figure 2 is a fragmentary diagrammatic side elevation of the car frame disclosing my improved support in end elevation, and Figure 3 is a plan view of the bracket.

Figures 4 to 8 inclusive are elevational views of the various elements comprising the present device.

Now having particular reference to the drawings, A in Figures 1 and 2 designate the center sill of a passenger car frame at the lower edge of which is a longitudinal angle bar B. The invention per se consists of a supporting bracket 5 for the pipe clamp per se, this clamp being in the form of a relatively elongated plate formed at its inner end with an upwardly offset longitudinal extension 6 formed with a pair of openings 7—7 to facilitate the bolting of this offset end to the channel bar B of the center sill A as suggested by the dotted lines in Figures 1 and 2. The bracket 5 extends at right angles to the center sill A and away from the car coupler shank C disclosed in dotted lines in Figure 1.

The opposite longitudinal edges of this bracket plate 5 are formed with reinforcing webs 8—8, while between the offset end 6 and a point adjacent the opposite end thereof said plate is slotted as at 9.

The invention further consists of a clamping unit for the car air and signal pipe D and E, which clamping unit comprises a relatively narrow arm 10, the upper end of which is longitudinally slidably arranged through the slot 9 in the bracket plate 5, said upper end being formed with a cross pin 11 to prevent the disengagement of the arm with respect to said bracket plate.

Cooperating with this arm 10 is a double pipe clamp jaw 12 in the form of a relatively narrow casting at the ends of which are curved jaws 13—13 of proper size in curvature with respect to the air and signal pipes D and E and adapted for engagement over the pipe as disclosed in Figure 1 after which said jaw 12 is bolted to the arm 10 as at 14, said arm and said jaw being formed with registering openings as clearly indicated in Figures 5 and 8.

Obviously through the provision of an air brake and signal pipe support of this character the ends of the air and signal pipes are free to move toward or away from the coupling heads of the car so as to permit the cars to turn on a curve without resulting in the stretching of the air or signal pipe and without any liability of the breaking of the angle cocks during the coupling of the car.

In view of the foregoing description when considered in conjunction with the accompanying drawings it will be obvious that I have produced a highly novel, simple and useful sliding and swinging support for air brake signal pipes on passenger cars, and even though I have herein shown and described the invention as consisting of certain detail structural elements it is nevertheless to be understood that some change may be made therein without affecting the spirit and scope of the appended claim.

Having thus described the invention what I claim as new is:—

A hanger for air brake and signal pipes of railway cars, a bracket adapted to be secured to the frame of the car, for disposition in a horizontal plane, said bracket consisting of a plate provided with upstanding flanges at its longitudinal edges, said plate being formed with a longitudinally extending slot, an arm provided with a cross pin disposed laterally and projecting from both sides of the arm, said arm being arranged for disposition slidably through the said slot of the plate with its cross pin resting on the plate and means for connecting a pipe to the arm.

In testimony whereof I affix my signature.

JAMES H. WILMORE.